United States Patent
Boesch et al.

(10) Patent No.: US 7,460,935 B2
(45) Date of Patent: Dec. 2, 2008

(54) SYSTEM FOR VALIDATING VELOCITIES OF COMPONENTS IN A VEHICLE

(75) Inventors: Mathew A. Boesch, Plymouth, MI (US); Vijay K. Garg, Canton, MI (US); Abbas Raftari, Northville, MI (US); Bader M. Badreddine, Dearborn, MI (US); Sergey G. Semenov, Farmington Hills, MI (US); Lawrence M. Rose, Berkley, MI (US); Gregory H. Benz, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/124,674

(22) Filed: May 21, 2008

(65) Prior Publication Data

US 2008/0221827 A1    Sep. 11, 2008

Related U.S. Application Data

(62) Division of application No. 10/605,288, filed on Sep. 19, 2003, now Pat. No. 7,406,366.

(51) Int. Cl.
G06F 7/00 (2006.01)
G06F 17/00 (2006.01)
B60K 6/20 (2007.10)
B60K 6/50 (2007.10)

(52) U.S. Cl. .................. 701/1; 701/31; 903/920

(58) Field of Classification Search .............. 701/1, 701/29, 31, 34, 36, 48, 51, 53–54, 58, 61–63, 701/69, 93, 97, 99, 110, 114; 477/5, 6; 192/3.51; 475/1; 903/902, 915, 920, 945
See application file for complete search history.

(56) References Cited

U.S. PATENT DOCUMENTS

| | | | |
|---|---|---|---|
| 4,354,144 A * | 10/1982 | McCarthy | ............. 318/13 |
| 5,161,174 A | 11/1992 | Pigozzi | |
| 5,898,281 A | 4/1999 | Bossoney et al. | |
| 6,389,346 B1 | 5/2002 | Gianoglio et al. | |
| 6,490,511 B1 | 12/2002 | Raftari et al. | |
| 6,654,648 B2 | 11/2003 | Nada et al. | |
| 2002/0111732 A1 * | 8/2002 | Jager et al. | ............. 701/62 |
| 2003/0164757 A1 * | 9/2003 | Hayashi et al. | ............. 340/441 |

* cited by examiner

Primary Examiner—Jack W Keith
Assistant Examiner—Edward Pipala
(74) Attorney, Agent, or Firm—David B. Kelley; Brooks Kushman P.C.

(57) ABSTRACT

A system for validating velocities of components in a vehicle uses sensor measurements and mathematical relationships between the vehicle components to validate the velocities. A controller or controllers receive speed or velocity inputs and mathematically combine the velocities of more than one of the vehicle components. The velocities of at least one of the vehicle components is validated when the mathematical combination meets at least one predetermined criterion. The validated velocity or velocities are then communicated to at least one of the vehicle components.

19 Claims, 4 Drawing Sheets

| TABLE 1 | | | |
|---|---|---|---|
| VARIABLE | DESCRIPTION | UNITS | INPUT RANGE |
| $\varpi_E$ | ENGINE VELOCITY | RAD/S | 0, 7000 (RPM) |
| $\varpi_{M1}$ | FIRST MOTOR VELOCITY | RAD/S | -1357, 1357 |
| $\varpi_{M2}$ | SECOND MOTOR VELOCITY | RAD/S | -943, 943 |
| $V_{VEH}$ | VEHICLE VELOCITY | KPH | 0, 300 |

SYSTEM FOR VALIDATING VELOCITIES OF COMPONENTS IN A VEHICLE

CROSS-REFERENCE TO RELATED APPLICATIONS

This application is a division of U.S. patent application Ser. No. 10/605,288 filed 19 Sep. 2003, which is hereby incorporated herein by reference.

BACKGROUND OF THE INVENTION

1. Field of the Invention

The present invention relates generally to the operation of a hybrid electric vehicle, and more particularly, to a diagnostic system and method for validating engine and motor velocities in a vehicle.

2. Background Art

A number of different types of vehicles include one or more electric motors and/or generators in addition to an internal combustion engine. For example, a hybrid electric vehicle may have a separate motor and generator, or a single unit in which the motor and generator are combined, in addition to a gasoline or diesel internal combustion engine. Other vehicle architectures may similarly include an engine and one or more electric motors. As the number of torque generating devices increases, control of such vehicles becomes increasingly complex.

Effective control of a vehicle having a complex architecture, including an engine and one or more electric motors and/or generators, may require knowledge of the speed at which each of the torque generating devices is operating. In addition, devices such as motors and generators can often rotate in either of two directions. Thus, in addition to the speed of a device such as a motor or generator, it may also be important to know the direction in which the device is rotating. The combination of speed and the direction of rotation is the velocity of the device, a knowledge of which is useful to control the vehicle.

Because of inaccuracies in measurement devices, such as sensors, and in communications links, such as a controller area network (CAN), sensor measurements may need to be validated to ensure their accuracy. Validation of the velocity of a torque generating device may require two independent speed measurements. The cost of providing a vehicle with two separate speed sensors for each torque generating device may be unacceptably high. Therefore, a need exists for a system and method for validating velocities of torque generating devices, such as engines and motors, in a vehicle, wherein the velocities can be validated using a single speed or velocity sensor for each torque generating device, and using a knowledge of the relationships between the speeds of the devices based on the vehicle architecture.

SUMMARY OF THE INVENTION

Therefore, the present invention provides a method for validating engine and motor velocities in a vehicle, without using two separate speed sensors for the engine and two speed sensors for the motor. The method includes measuring engine speed, thereby facilitating a determination of engine velocity. The velocity of a first motor is also measured. The engine velocity and the velocity of the first motor are used in a first equation, which includes the use of a first velocity relationship. The first velocity relationship relates the engine velocity and the velocity of the first motor based on vehicle architecture. The first equation is determinative of whether a mathematical combination of at least the engine velocity and the velocity of the first motor is within a first predetermined speed range. The engine velocity and the velocity of the first motor are validated when the mathematical combination of at least the engine velocity and the velocity of the first motor is within the first predetermined speed range.

The invention also provides a method for validating engine and motor velocities in a vehicle having an engine, a first motor, and a second motor. The method includes measuring engine speed, thereby facilitating a determination of engine velocity. The velocity of the first and second motors is also measured. The engine velocity and the velocity of the first and second motors are mathematically combined to generate a first combined speed term. The first combined speed term is compared to a first predetermined speed range. The engine velocity, the velocity of the first motor, and the velocity of the second motor are validated when the first combined speed term is within the first predetermined speed range.

The invention further provides a system for validating engine and motor velocities in a vehicle having an engine and at least one motor. The system includes a first sensor configured to measure engine speed, thereby facilitating a determination of engine velocity. A second sensor is configured to measure the velocity of a first motor. A controller is in communication with the first and second sensors, and is configured to apply a preprogrammed algorithm to at least the engine velocity and the velocity of the first motor. The preprogrammed algorithm includes a determination of whether a mathematical combination of at least the engine velocity and the velocity of the first motor is within a first predetermined speed range. The engine velocity and the velocity of the first motor are validated when the mathematical combination is within the first predetermined speed range.

DETAILED DESCRIPTION OF EMBODIMENTS OF THE INVENTION

Figure 1:
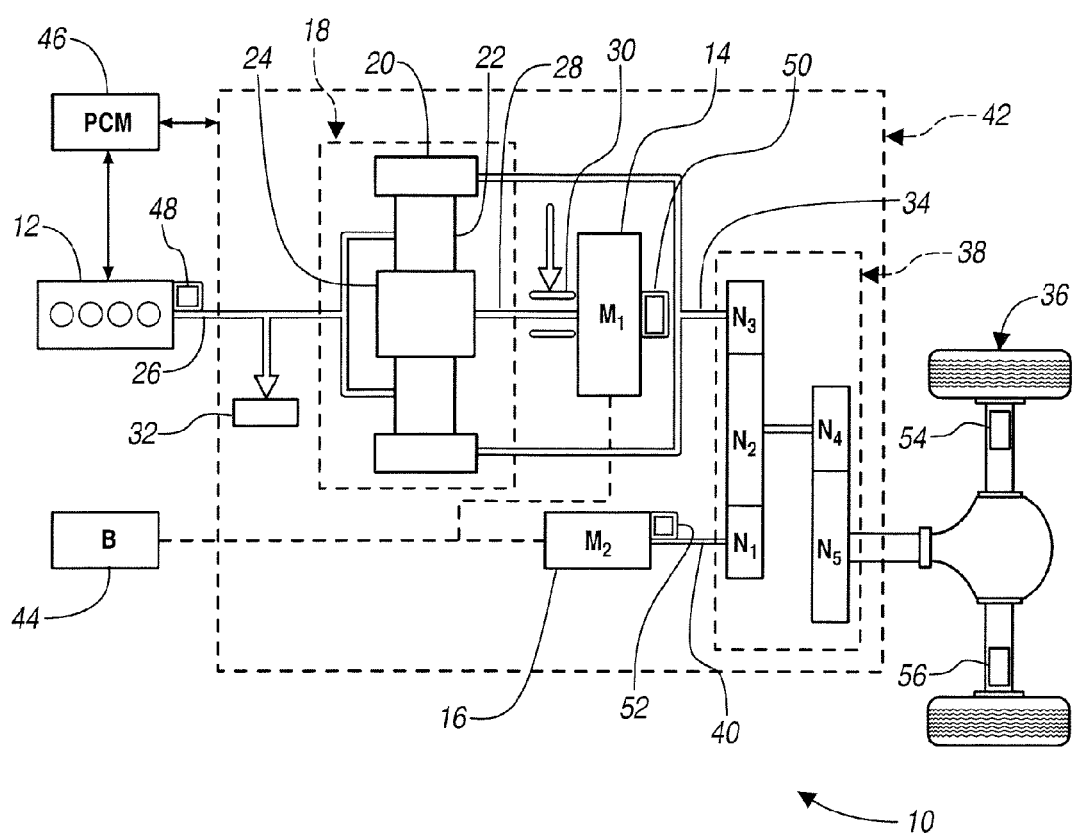
FIG. 1 is a schematic representation of a portion of a vehicle including a system in accordance with the present invention.

FIG. 1 shows a schematic representation of a system 10 in accordance with the present invention. A vehicle, not shown in its entirety, includes an engine 12, a first motor 14, and a second motor 16. The engine 12 and the first motor 14 are connected through a power transfer unit, which in this embodiment is a planetary gear set 18. Of course, other types of power transfer units, including other gear sets and transmissions, may be used to connect the engine 12 to the first motor 14. The planetary gear set 18 includes a ring gear 20, a carrier 22, and a sun gear 24. An engine shaft 26 is connected to the carrier 22, while a motor shaft 28 is connected to the sun gear 24. A motor brake 30 is provided for stopping rotation of the motor shaft 28, thereby locking the sun gear 24 in place. Because this configuration allows torque to be transferred from the first motor 14 to the engine 12, a one-way clutch 32 is provided so that the engine shaft 26 rotates in only one direction.

The ring gear 20 is connected to a shaft 34, which is connected to vehicle drive wheels 36 through a second gear set 38. The second motor 16 is also connected to the wheels 36 through a second motor shaft 40 and the second gear set 38. The motors 14,16, the planetary gear set 18, and the second gear set 38 may generally be referred to as a transaxle 42.

The first and second motors 14,16 are electrically connected to a battery 44. The battery 44 provides electrical power to one or both of the first and second motors 14,16 when they output mechanical energy to the wheels 36. Alternatively, one or both of the motors 14,16 can act as a generator that can be used to charge the battery 44 when the vehicle is in a regenerative mode or when the engine is running. Moreover, either of the motors 14 or 16 could act as a generator to provide electrical power to the other motor.

The vehicle architecture shown in FIG. 1 is but one of many different architectures that can be used with the system 10. For example, as mentioned above, the planetary gear set 18 could be replaced with different types of power transfer units. In addition, as explained more fully below with reference to FIG. 4, a disconnect clutch could be placed on the engine shaft 26 to allow a mechanical disconnection of the engine output from the wheels 36. Moreover, different types of electrical output devices, such as a fuel cell or ultra-capacitor, may be used in place of, or in conjunction with, a battery, such as the battery 44.

A controller, in this embodiment, a powertrain control module (PCM) 46 is provided for controlling the engine 12 and the motors 14,16. Although shown as a single unit, the PCM 46 may be made up of more than one controller. For example, rather than the single PCM 46, the engine 12 and each of the motors 14,16 may have their own control unit in the form of a separate hardware device. Alternatively, the controllers for the engine 12 and the motors 14,16 may be software controllers that reside within one or more hardware controllers, such as a vehicle system controller.

In order to provide information to the PCM 46 about the speeds and/or velocities of the various torque generating devices in the vehicle—i.e., the engine 12 and motors 14,16—a number of sensors are used to take measurements and provide information to the PCM 46. A first sensor 48 is in communication with the PCM 46, and is configured to measure the speed of the engine 12, which facilitates a determination of engine velocity. The engine velocity includes not only the engine speed, but also the direction of rotation. Because the engine 12 can only rotate in one direction, the speed sensor 48 may be a simple speed sensor that does not measure the direction of rotation of the engine 12, since the direction is already known. Thus, the speed sensor 48 provides information to the PCM 46 such that the velocity of the engine 12 is known.

A second sensor 50, also in communication with the PCM 46, is configured to measure the velocity of the first motor 14. Because the first motor 14 may rotate in either one of two different directions, the sensor 50 must measure not only the speed of rotation, but also the direction of rotation. Similarly, a third sensor 52, also in communication with the PCM 46, is configured to measure both the speed and direction of rotation of the second motor 16—i.e., the sensor 52 measures the velocity of the second motor 16. Fourth and fifth sensors 54,56, similarly in communication with the PCM 46, are configured to measure the speed of the wheels 36.

Although the sensors 54,56 do not provide the direction of rotation of the wheels 36, as explained more fully below, the direction of rotation may be assumed for purposes of velocity validation. It is worth noting that the vehicle speed may be determined from a single sensor, rather than two sensors, such as the sensors 54,56. Moreover, the speed of a non-drive wheel or wheels may be measured, rather than the speed of the drive wheels as illustrated in FIG. 1.

As mentioned above, the system 10 may be used to validate the velocities of the engine 12 and the motors 14,16. The speed sensor 48, or a similarly configured sensor, will be found on most vehicles, since measurement of engine speed is an important parameter for vehicle control. Moreover, sensors, such as the speed sensors 54,56, are also found on many vehicles as part of an anti-lock brake system. Validating the velocity of a device, such as the engine 12 or the motors 14,16, requires two independent measurements for each device. Of course, two dedicated sensors for each device can be used to perform the measurements, but this may be a costly solution. In contrast, the system 10 provides a method of velocity validation that utilizes existing sensors and relationships between the devices, such that two dedicated sensors are not required for each device.

Figure 2A:
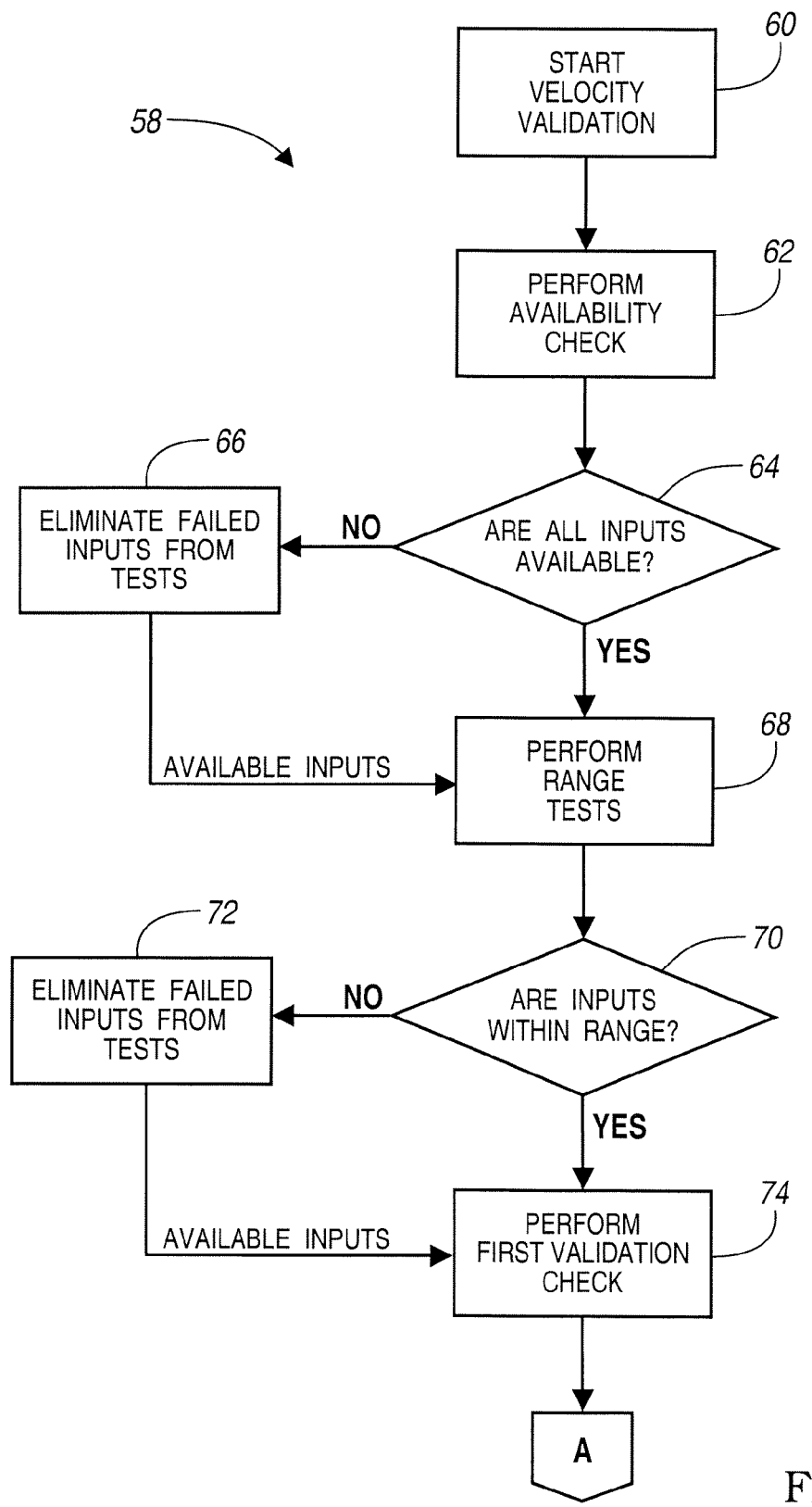
FIGS. 2A and 2B are a flow chart illustrating a method in accordance with the present invention.
Figure 2B:
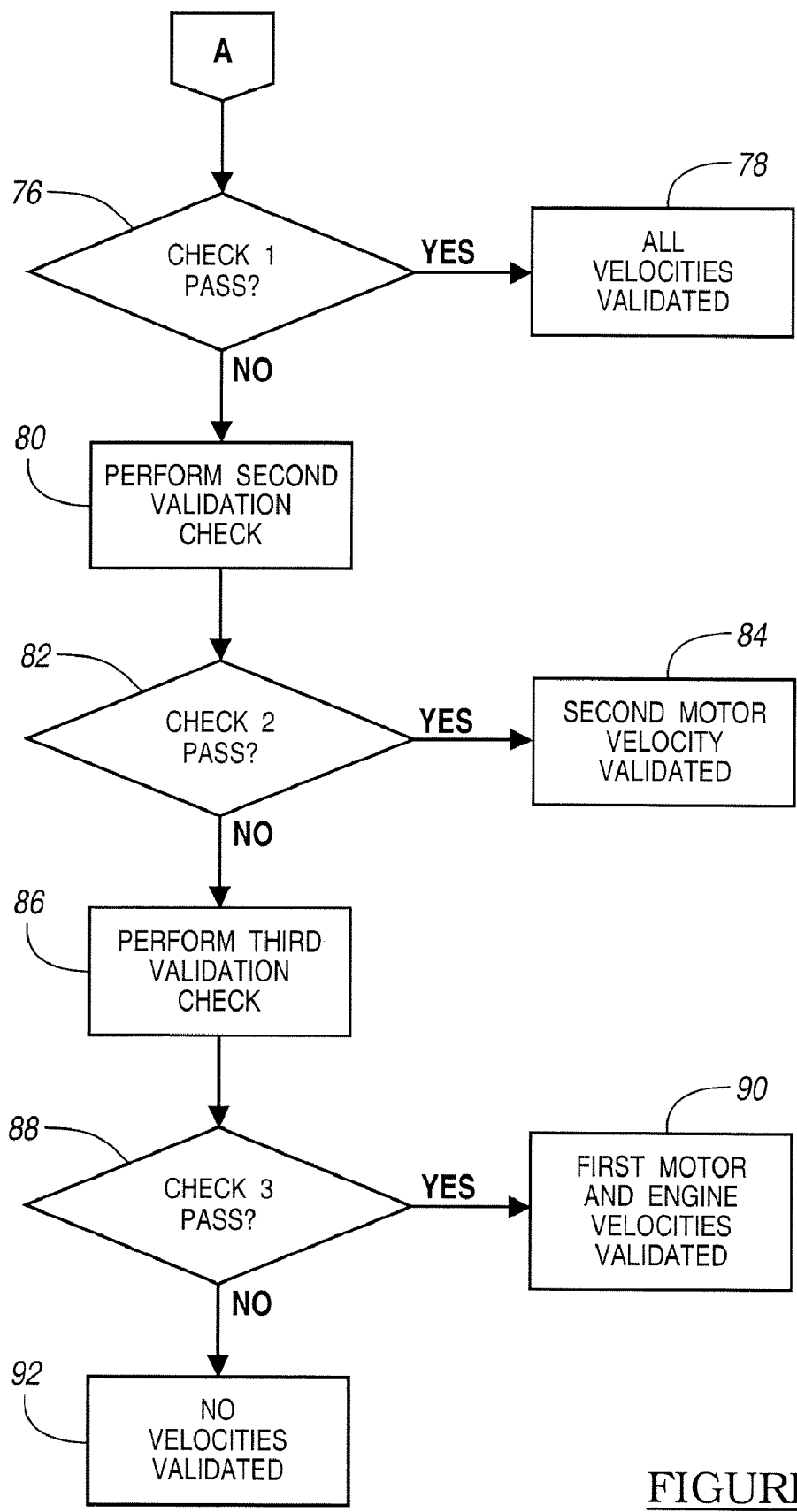

FIGS. 2A and 2B show a flow chart 58 illustrating a method for velocity validation using the system 10. The velocity validation begins at step 60, and is initiated by the PCM 46. The PCM 46 may be programmed such that some or all of the steps shown in FIGS. 2A and 2B are repeatedly performed while any of the torque generating devices are running.

Initially, it may be useful to perform an availability check, wherein it is determined whether each of the inputs—i.e., each of the signals from the sensors 48,50,52,54,56 to the PCM 46—are functioning, see step 62. If any of the signals indicate that a sensor has a fault, or is otherwise unavailable, the faulted sensor is considered unavailable for the velocity validation tests. As noted above, the PCM 46 is in communication with each of the sensors 48,50,52,54,56. The communication link may be in the form of a controller area network (CAN). The availability check may also indicate that a signal has a CAN error. When the PCM 46 receives such a signal, the sensor having the CAN error will be considered unavailable.

If, in step 64, it is determined that not all of the inputs are available, the failed inputs are eliminated from further tests, see step 66. The inputs that are available are then passed to the next set of tests, which are range tests for each of the inputs, see step 68. Of course, when all the inputs were determined to be available in step 64, then all of the inputs are made available for the range tests. In step 70 it is determined whether all of the inputs are within a corresponding predetermined range. The predetermined ranges may be chosen based on known operating ranges for each device. The predetermined ranges, or input ranges, need not exactly match the operating range of a given device, but rather, may be limited or expanded as desired.

Figures 3, 4:
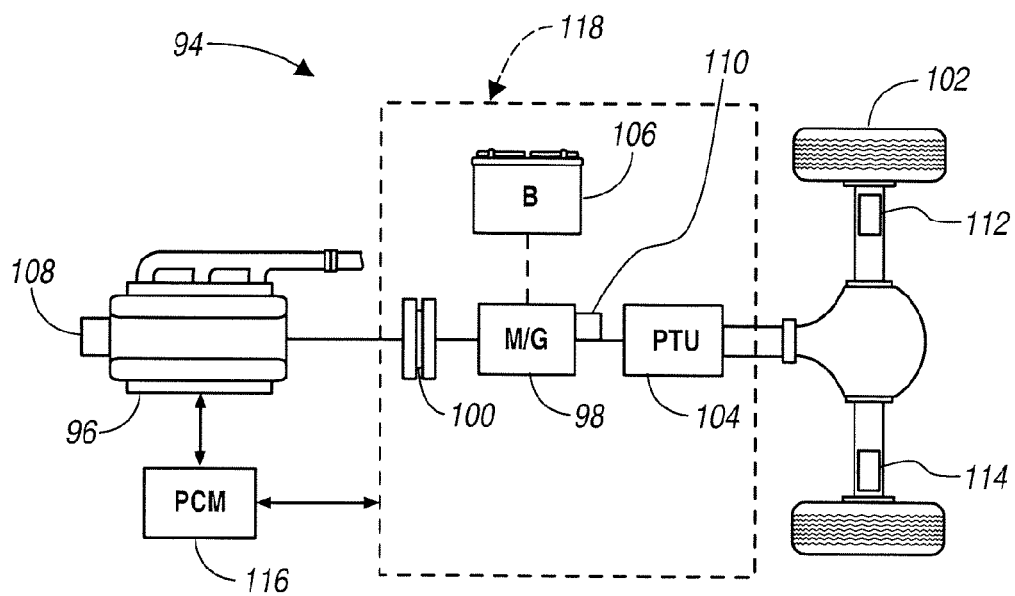
FIG. 3 is a table defining equation variables and input ranges for each of the variables.
FIG. 4 is a schematic representation of a portion of a vehicle having a different architecture from the vehicle shown in FIG. 1, and an alternative embodiment of the system shown in FIG. 1.

Using range tests prior to performing the velocity validation tests, may make the method of velocity validation more robust. For example, if a sensor provides an input to the PCM 46 indicating that one of the devices or the vehicle has a velocity that is outside the input range, this may be indicative of a problem with the sensor. As shown in FIG. 3, Table 1 includes an input range for each of the variables that will be used in the velocity validation tests. For example, the engine velocity ($\omega_E$) has an input range of 0 to 7000 revolutions per minute (RPM). Although the units shown in Table 1 are radians per second (RAD/S), which may be conveniently used in the validation tests, there is a direct relationship between RAD/S and RPM. Therefore, a simple conversion factor can be employed to switch between units.

Similarly, the velocity of the first motor ($\omega_{M1}$) has a normal operating range of −1357 to 1357 RAD/S. The velocity of the second motor ($\omega_{M2}$) has an input range of −943 to 943 RAD/S. Finally, the vehicle velocity ($V_{VEH}$) has an input range of 0 to 300 kilometers per hour (KPH). Each of the input ranges may be programmed into the PCM 46, for example, in the form of a lookup table. Alternatively, the input ranges could be programmed into one or more different controllers that are in communication with the PCM 46, for example, through a CAN.

It is important to note that the input ranges shown in Table 1 are merely one example of input ranges that may be set for a vehicle or power producing devices within the vehicle. Thus, different vehicle architectures, vehicles having different power producing devices, as well as other considerations, may lead to the assignment of input ranges different from those shown in Table 1. Thus, the range tests provide a flexible tool by which inputs from the sensors 48,50,52,54,56 are checked prior to the velocity validation tests.

Returning to FIG. 2A, it is seen that if not all of the inputs are found to be within their corresponding input ranges in step 70, they are eliminated from further tests in step 72. The elimination of an input, either because of a failed availability check or failed range test, may preclude a particular validation test from being performed. One method that can be used when this situation occurs, is to assume that the test was performed, but that it failed. Of course, other methods may be employed when inputs fail the range tests. Any inputs that remain available are then used to perform the validation tests, starting with the first validation check in step 74. Of course, if all of the inputs pass the range tests in step 70, they are all available in step 74 to perform the first validation check.

The first validation check uses the velocity of the engine 12 and the motors 14,16, and a known relationship between the velocities based on the vehicle architecture shown in FIG. 1, to validate the velocities of each of the devices. Specifically, the engine speed, as measured by the sensor 48, provides an input to the PCM 46, which determines the engine velocity based on the known direction of engine rotation. The velocity of the first and second motors 14,16 is measured by the sensors 50,52, respectively. These velocities are also provided as inputs to the PCM 46.

The PCM 46 applies a preprogrammed algorithm to the inputs it receives from the sensors 48,50,52. The velocities of the engine 12 and the first and second motors 14,16 are mathematically combined and compared to a first predetermined speed range. The preprogrammed algorithm in the PCM 46 mathematically combines these terms and determines whether this mathematical combination is within the first predetermined speed range. Although a number of different equations can be used to make this determination, the first equation used in the validation tests may be defined by:

$$|\omega_E - (R_{E/M1})\omega_{M1} - (R_{E/M2})\omega_{M2}| \leq K_1 \qquad \text{Eq. 1}$$

where $\omega_E$ is the engine velocity, $\omega_{M1}$ is the velocity of the first motor, $\omega_{M2}$ is the velocity of the second motor, $R_{E/M1}$ is a ratio of the engine velocity to the velocity of the first motor, $R_{E/M2}$ is a ratio of the engine velocity to the second motor, and $K_1$ is a first predetermined speed.

The ratios used in Equation 1, $R_{E/M1}$ and $R_{E/M2}$, are first and second velocity relationships that are based on the vehicle architecture. Specifically, the planetary gear set 18 provides a known relationship between the velocity of the engine 12 and the velocity of the first motor 14. Where other power transfer units are used, different relationships may exist between the velocities of the engine 12 and the first motor 14. Similarly, a known relationship exists between the velocity of the engine 12 and the velocity of the second motor 16, based on the planetary gear set 18 and the second gear set 38. Applying these relationships to the velocities of the first and second motors 14,16 allows the velocities of each of the three power producing devices to be validated, using a single sensor at each device.

The left-hand side of Equation 1 represents a first combined speed term, which is then compared to the first predetermined speed range, defined in Equation 1 as any speed less than or equal to $K_1$. The mathematical combination used to develop the first combined speed term may assume a number of different forms and still be useful for velocity validation. For example, the sign of any of the terms can be changed, the order of the terms can be rearranged, or one of the motor velocities can be used without a ratio applied to it, while a different ratio—e.g., a motor velocity to engine velocity ratio ($R_{M/E}$)—is applied to the engine velocity. In any of these cases, Equation 1 would still be valid, provided that $K_1$ was assigned an appropriate value that defined the correct predetermined speed range for the mathematical combination on the left side of the equation.

Turning to FIG. 2B, it is determined at step 76 whether the first validation check passed—i.e., whether the first combined speed term was within the first predetermined speed range. If the first validation check passes, then the velocity of each power producing device—the engine 12 and the motors 14,16—are validated; this is shown in step 78. If, however, the first combined speed term was not within the first predetermined speed range, a second velocity validation check may be performed, see step 80.

The second velocity check, as performed in step 80, provides a method to validate the velocity of the second motor. As described above, the velocity of the second motor is measured directly by the sensor 52; however, it is necessary to have another velocity measurement in order to confirm that the velocity measured by the sensor 52 is valid. Rather than adding a second velocity sensor to the second motor 16, the existing vehicle speed sensors 54, 56 are used, which saves the cost of an additional velocity sensor. As described above, the speed sensors 54, 56 are not capable of determining the direction of rotation of the wheels 36. Therefore, the second validation check, which uses a second equation, will perform an evaluation of the second equation two times. The first time the second equation is evaluated, a positive sign is assigned to the vehicle speed; the second time it is evaluated, a negative sign is assigned to the vehicle speed.

Each of the sensors 54, 56 provides a measurement of the speed of the wheels 36, which is indicative of the vehicle speed. In order to get a single value for the vehicle speed, the measurements from the sensors 54, 56 may be mathematically combined, for example, by using an average value of the two measured speeds. Thus, the determination of the vehicle speed may include measuring the wheel speed with the sensor 54 and the sensor 56, and then taking the average of the two wheel speeds. Of course, the measured speeds may be combined using some other mathematical combination, or a single sensor may be used, as desired.

Because the vehicle velocity will typically have units such as KPH, it will be necessary to convert the units into RAD/S to be compatible with the velocity of the second motor 16 as measured by the sensor 52. The second validation check can then be performed by mathematically combining the velocity of the second motor 16 and the determined vehicle speed, and then comparing this mathematical combination to a second predetermined speed range to validate the velocity of the second motor 16. Although various forms of the second equation may be used for the second validation check, one form of the equation is defined by:

$$|\omega_{M2} - (C_1)V_{VEH}| < K_2 \qquad \text{Eq. 2}$$

where $\omega_{M2}$ is the velocity of the second motor, $C_1$ is a constant used to change units of vehicle velocity into radians per second, $V_{VEH}$ is the determined vehicle velocity, and $K_2$ is a second predetermined speed.

Just as with the first equation, the second equation includes a mathematical combination of velocities on the left side of the equation, which may be called a "second combined speed term." The second predetermined speed range is defined as any speed less than the second predetermined speed ($K_2$). As with the first combined speed term in the first equation, the second combined speed term in Equation 2 may also be rearranged using a different order of the terms, or applying different signs to the terms. Of course, the second predetermined speed ($K_2$) would need to be chosen appropriately; however, variations of Equation 2 involving different mathematical combinations of the velocity of the second motor 12 and the vehicle velocity are contemplated within the present invention.

As noted above, the speed sensors 54, 56 do not provide a direction for the rotation of the wheels 36. Therefore, Equation 2 is evaluated twice: a first time wherein the determined vehicle velocity is given a positive sign, and a second time wherein the vehicle velocity is given a negative sign. In each case, it is required that the relationship expressed in Equation 2 holds. Stated another way, the second combined speed term is generated twice, and each time it is required to be within the second predetermined speed range.

Returning to FIG. 2B, the determination of whether the second velocity check passes occurs at step 82. If Equation 2 is found to hold when the vehicle velocity is given a positive sign and when it is given a negative sign, the second validation check has passed. When this occurs, the velocity of the second motor 16 is validated, see step 84. If Equation 2 does not hold for either the positive or negative value of vehicle velocity, a third validation check may be performed, see step 86.

For the third validation check, the PCM 46 mathematically combines the velocities of the engine 12 and the first motor 14, with the determined vehicle speed to generate a third combined speed term. The third combined speed term is then compared to a third predetermined speed range for purposes of validating the velocities of the engine 12 and the first motor 14. Specifically, a third equation is used that is similar to the first equation, except that the term that included the velocity of the second motor 16 is replaced by the determined vehicle velocity term. It is worth noting that just as with Equations 1 and 2, Equation 3 may assume different forms. Thus, Equation 3 may be defined by:

$$|\omega_E(R_{E/M1})\omega_{M1} - (C_1)V_{VEH}| \leq K_3 \qquad \text{Eq. 3}$$

where $\omega_E$ is the engine velocity, $\omega_{M1}$ is the velocity of the first motor, $R_{E/M1}$ is a ratio of the engine velocity to the velocity of the first motor, $C_1$ is a constant used to change units of vehicle velocity into radians per second, $V_{VEH}$ is the determined vehicle velocity, and $K_3$ is a third predetermined speed.

Because equation 3 involves the determined vehicle velocity, it must be evaluated twice, just as Equation 2 is evaluated twice. Thus, the determined vehicle velocity is assigned a positive sign the first time Equation 3 is evaluated, and a negative sign the second time it is evaluated. Returning to FIG. 2B, a determination is made at step 88 whether the third validation check has passed. If the third validation check passes, the velocities of the engine 12 and the first motor 14 are validated. If, however, the third validation check does not pass, then none of the velocities are validated, see step 92.

As described above, the system 10 shown in FIG. 1 can be used with any of a variety of vehicle architectures. For example, FIG. 4 shows a schematic representation of a system 94, which is an alternative embodiment of the present invention. A vehicle, not shown in its entirety, includes an engine 96 and a first motor, or combined motor/generator 98. A disconnect clutch 100 is disposed between the engine 96 and the motor/generator 98 for selectively connecting and disconnecting the engine 96 to the wheels 102. The motor/generator 98 is connected to a power transfer unit (PTU) 104, which transfers power from the motor/generator 98 to the wheels 102. The PTU 104 may be virtually any device or system for transferring power, including, but not limited to, gear sets, automatic or manual transmissions, or converterless transmissions.

A battery 106 is electrically connected to the motor/generator 98 for providing electrical power to the motor/generator 98 when it is being operated as a motor to drive the wheels 102. Alternatively, the motor/generator 98 may act as a generator to recharge the battery 106, when the vehicle is in a regenerative mode. Similar to the configuration shown in FIG. 1, the engine 96 is equipped with a speed sensor 108 which facilitates a determination of the engine velocity; the velocity can be determined with a speed sensor, since the engine 96 rotates in only one direction. A sensor 110 is provided for measuring the velocity of the motor/generator 98. Moreover, speed sensors 112,114 are provided at the wheels 102 to facilitate a determination of the vehicle velocity. A controller, in the embodiment shown in FIG. 4, a PCM 116, is in communication with a transaxle 118, the engine 96, and each of the sensors 108,110,112,114.

As with the vehicle architecture shown in FIG. 1, the vehicle architecture in FIG. 4 includes three sensors 108,112, 114 that are normally provided on many vehicles, and therefore do not require a special purchase or installation. Because the vehicle shown in FIG. 4 includes only a first motor, the motor/generator 98, only one additional sensor, the sensor 110, is needed to validate the velocities of the engine 96 and the motor/generator 98. It will be apparent to one skilled in the art, that minor modifications to equations 1-3 are all that is needed to provide a method for validating the velocities of torque generating devices in a vehicle having an architecture similar to that shown in FIG. 4. For example, a modified version of equation one may be defined by:

$$|\omega_E(R_{E/MG})\omega_{MG}| \leq K_{1A} \qquad \text{Eq. 1A}$$

where $\omega_E$ is the engine velocity, $\omega_{MG}$ is the velocity of the first motor, or motor/generator 98, $R_{E/MG}$ is a ratio of the engine velocity to the velocity of the motor/generator, and $K_{1A}$ is a first predetermined speed.

The ratio used in Equation 1A, ($R_{E/MG}$), is a first velocity relationship that is based on the vehicle architecture shown in FIG. 4. For example, when the disconnect clutch 100 is closed, a known relationship exists between the velocities of the engine 96 and the motor/generator 98. When the disconnect clutch 100 is open, however, there is no such velocity relationship, and Equation 1A cannot be used. Just as with Equations 1-3, Equation 1A may assume different forms, provided the appropriate value for $K_{1A}$ is chosen. When Equation 1A holds,—i.e., if the first validation check passes—only the velocities of the engine 96 and the motor/generator 98 are validated. There is no second motor in this configuration that requires a velocity validation.

The second validation check will remain largely unaltered for the vehicle architecture shown in FIG. 4. For example, a second equation, equation 2A, used for the second validation check for a vehicle having the architecture shown in FIG. 4, may be defined by:

$$|\omega_{MG}-(C_1)V_{VEH}|<K_{2A} \qquad \text{Eq. 2A}$$

where $\omega_{MG}$ is the velocity of the first motor, or motor/generator 98, $C_1$ is a constant used to change units of vehicle velocity into RAD/S, $V_{VEH}$ is the determined vehicle velocity, and $K_{2A}$ is a second predetermined speed.

Thus, a mathematical combination of the velocity of the motor/generator 98 and the determined vehicle speed is compared to a second predetermined speed range. As with the other equations, the mathematical combination on the left hand side of equation 2A may be rearranged as desired, provided an appropriate value of $K_{2A}$ is chosen. As with Equation 2, and all of the equations involving the determined vehicle velocity, Equation 2A must be evaluated twice, with the determined vehicle velocity being given a different sign each time. If Equation 2A holds for each of the two evaluations, the second validation check has passed. When this occurs, the velocity of the first motor, or the motor/generator 98, is validated. If this does not occur, a third validation check may be used.

For the vehicle architecture shown in FIG. 4, the third validation check involves the use of a third equation, which may be defined by:

$$\omega_E(C_1)V_{VEH}|\leq K_{3A} \qquad \text{Eq. 3A}$$

where $\omega_E$ is the engine velocity, $C_1$ is a constant used to change units of vehicle velocity into RAD/S, $V_{VEH}$ is the determined vehicle velocity, and $K_{3A}$ is a third predetermined speed. Because Equation 3A uses the vehicle velocity, it is evaluated twice, giving the vehicle velocity a different sign each time. Moreover, Equation 3A, as with any of the previous equations, may assume different forms, provided an appropriate value for $K_{3A}$ is chosen. If both evaluations of Equation 3A hold, then the engine velocity is validated.

Although the vehicle architectures shown in FIG. 1 and FIG. 4 appear to be markedly different, there is some similarity. For example, the motor brake 30, shown in FIG. 1, may be selectively applied to stop rotation of the motor shaft 28 and the sun gear 24. In such a situation, the vehicle architecture of FIG. 1 resembles the vehicle architecture of FIG. 4, wherein the planetary gear set 18 and the second gear set 38 are represented by the PTU 104 in FIG. 4. Of course, the system 10 may be used with a variety of different vehicle architectures, it being understood that the architectures illustrated in FIGS. 1 and 4 represent just two examples.

While the best mode for carrying out the invention has been described in detail, those familiar with the art to which this invention relates will recognize various alternative designs and embodiments for practicing the invention as defined by the following claims.

What is claimed:

1. A system for validating engine and motor velocities in a vehicle having a plurality of vehicle components, including an engine and a first motor arranged in a vehicle architecture such that at least one known mathematical relationship exists between the engine velocity and the velocity of the first motor, the system comprising:
   a first sensor configured to measure engine speed, thereby facilitating a determination of engine velocity;
   a second sensor configured to measure the velocity of the first motor; and
   a controller in communication with the first and second sensors, and configured to determine whether a mathematical combination of at least the engine velocity and the velocity of the first motor is within a first predetermined speed range, the engine velocity and the velocity of the first motor being validated when the mathematical combination is within the first predetermined speed range, the controller being further configured to communicate at least one of the validated engine velocity or the validated velocity of the first motor to at least one of the vehicle components.

2. The system of claim 1, the vehicle further including at least one drive wheel, the system further comprising at least one other sensor in communication with the controller and configured to measure the speed of a respective one of the at least one drive wheel, thereby facilitating a determination of vehicle speed by the controller, the controller being further configured to determine whether a mathematical combination of the velocity of the first motor and the determined vehicle speed is within a second predetermined speed range when the mathematical combination of the engine velocity and the velocity of the first motor are not within the first predetermined speed range.

3. The system of claim 2, the vehicle including two of the drive wheels, and wherein the system includes two of the other sensors, the controller being configured to determine the vehicle speed based on a mathematical average of the wheel speeds measured by the two other sensors.

4. The system of claim 2, wherein the controller is further configured to twice determine whether the mathematical combination of the velocity of the first motor and the determined vehicle speed is within the second predetermined speed range, the determined vehicle speed being given an opposite sign in each of the two determinations,
   the velocity of the first motor being validated when the mathematical combination of the velocity of the first motor and the determined vehicle speed is within the second predetermined speed range regardless of the sign given to the determined vehicle speed,
   the controller being further configured to communicate the validated velocity of the first motor to at least one of the vehicle components.

5. The system of claim 2, wherein the controller is further configured to twice determine whether a mathematical combination of the engine velocity and the determined vehicle speed is within a third predetermined speed range, the determined vehicle speed being given an opposite sign in each of the two determinations,
   the engine velocity being validated when the mathematical combination of the engine velocity and the determined vehicle speed is within the third predetermined speed range regardless of the sign given to the determined vehicle speed,
   the controller being further configured to communicate the validated engine velocity to at least one of the vehicle components.

6. The system of claim 2, the vehicle further including a second motor arranged in the vehicle architecture such that at least one known mathematical relationship exists between the engine velocity and the velocity of the second motor, the system further comprising a third sensor configured to measure the velocity of the second motor, and
   wherein the controller is further configured to include the velocity of the second motor in the mathematical combination of the engine velocity and the first vehicle speed,
   the engine velocity, the velocity of the first motor, and the velocity of the second motor being validated when the mathematical combination of the engine velocity and the velocities of the first and second motors is within the first predetermined speed range, the controller being further configured to communicate at least one of the validated engine velocity, the validated velocity of the first motor, or the validated velocity of the second motor to at least one of the vehicle components.

7. The system of claim 6, wherein the controller is further configured to determine whether a mathematical combination of the velocity of the second motor and the determined vehicle speed is within the second predetermined speed range when the mathematical combination of the engine velocity and the velocities of the first and second motors is not within the first predetermined speed range, the velocity of the second motor being validated when the mathematical combination of the velocity of the second motor and the determined vehicle speed is within the second predetermined speed range, the controller being further configured to communicate the validated velocity of the second motor to at least one of the vehicle components.

8. A system for validating engine and motor velocities in a vehicle having a plurality of vehicle components, including an engine, a first motor, and a second motor arranged in a vehicle architecture such that at least one known mathematical relationship exists between the engine velocity and each of the velocities of the first and second motors, the system comprising:

a first sensor configured to measure engine speed, thereby facilitating a determination of engine velocity;

a second sensor configured to measure the velocity of the first motor;

a third sensor configured to measure the velocity of the second motor; and a controller in communication with the first, second and third sensors, and configured to combine the engine velocity and the velocities of the first and second motors to generate a first combined speed term and compare the first combined speed term to a first predetermined speed range, the engine velocity and the velocities of the first and second motors being validated when the first combined speed term is within the first predetermined speed range, the controller being further configured to communicate at least one of the validated determined engine velocity, the validated measured velocity of the first motor, or the validated measured velocity of the second motor to at least one of the vehicle components.

9. The system of claim 8, the vehicle further including at least one drive wheel, the system further comprising at least one other sensor in communication with the controller and configured to measure the speed of a respective one of the at least one drive wheel, thereby facilitating a determination of vehicle speed by the controller, the controller being further configured to:

mathematically combine the measured velocity of the second motor and the determined vehicle speed to generate a second combined speed term, compare the second combined speed term to a second predetermined speed range, the measured velocity of the second motor being validated when the second combined speed term is within the second combined speed range, and communicate the validated measured velocity of the second motor to at least one of the vehicle components.

10. The system of claim 9, the vehicle including two of the drive wheels, and wherein the system includes two of the other sensors, the controller being configured to determine the vehicle speed based on a mathematical average of the wheel speeds measured by the two other sensors.

11. The system of claim 9, wherein the controller is configured to generate the second combined speed term twice, a first time with the determined vehicle speed being given a positive sign, and a second time with the determined vehicle speed being given a negative sign, and wherein the measured velocity of the second motor is validated only when both of the generated second combined speed terms are within the second predetermined speed range.

12. The system of claim 9, wherein the controller is further configured to:

mathematically combine the determined engine velocity, the measured velocity of the first motor, and the determined vehicle speed to generate a third combined speed term, compare the third combined speed term to a third predetermined speed range, the determined engine velocity and the measured velocity of the first motor being validated when the third combined speed term is within the third predetermined speed range, and communicate at least one of the validated determined engine velocity or the validated measured velocity of the first motor to at least one of the vehicle components.

13. The system of claim 12, wherein the controller is configured to generate the third combined speed term twice, a first time with the determined vehicle speed being given a positive sign, and a second time with the determined vehicle speed being given a negative sign, and wherein the determined engine velocity and the measured velocity of the first motor are validated only when both of the generated third combined speed terms are within the third predetermined speed range.

14. The system of claim 13, wherein the controller is further configured to determine whether the measured engine speed, the measured velocity of the first motor, the measured velocity of the second motor, and the determined vehicle speed are each within a corresponding predetermined range prior to generating any of the combined speed terms.

15. A system for validating component velocities in a vehicle having a plurality of vehicle components, at least one pair of the vehicle components being arranged in a vehicle architecture such that a respective known mathematical relationship exists between the respective velocities of the vehicle components in each of the at least one pair, the system comprising:

a first sensor configured to measure at least one of a velocity or speed of a first of the vehicle components;

a second sensor configured to measure at least one of a velocity or speed of a second of the vehicle components, the first and second vehicle components being arranged in one of the pairs of vehicle components;

a controller in communication with the first and second sensors, and configured to:

calculate a velocity of the first vehicle component when the first sensor is configured to measure speed, calculate a velocity of the second vehicle component when the second sensor is configured to measure speed, determine whether a mathematical combination of at least the velocities of the first and second vehicle components is within a first predetermined speed range, the velocities of the first and second vehicle components being validated when the mathematical combination is within the first predetermined speed range, and communicate at least one of the validated velocities of the first and second vehicle components to at least one of the vehicle components.

16. The system of claim 15, wherein the velocity of one of the vehicle components in the at least one pair is a velocity of the vehicle.

17. The system of claim 15, wherein the first and second vehicle components respectively include an engine and a first motor.

18. The system of claim 17, wherein the vehicle components further include a second motor arranged in another of the pairs of vehicle components with one of the engine or the first motor, the system further comprising a third sensor configured to measure the velocity of the second motor, the controller being further configured to:
   include the velocity of the second motor in the mathematical combination, the engine velocity, the velocity of the first motor, and the velocity of the second motor being validated when the mathematical combination of the engine velocity and the velocities of the first and second motors is within the first predetermined speed range, and
   communicate at least one of the validated engine velocity, the validated velocity of the first motor, or the validated velocity of the second motor to at least one of the vehicle components.

19. A system for validating engine and motor velocities in an automotive vehicle, the system comprising:
   a first sensor configured to measure engine speed, thereby facilitating a determination of engine velocity;
   a second sensor configured to measure the velocity of a motor; and
   a controller, in communication with the first and second sensors, configured to:
      validate the engine velocity and the motor velocity when a mathematical combination thereof is within a predetermined speed range, and
      communicate at least one of the validated engine velocity or the validated motor velocity to a vehicle component.

* * * * *